April 6, 1954     W. N. LINDSAY ET AL     2,674,338
METHOD AND APPARATUS FOR THE RECOVERY OF
NITROGEN OXIDES FROM GASEOUS MIXTURES
Filed Dec. 2, 1949     6 Sheets-Sheet 1

INVENTORS
WESLEY N. LINDSAY
WILLIAM G. HENDRICKSON

BY Hans G. Hoffmeister
ATTORNEY

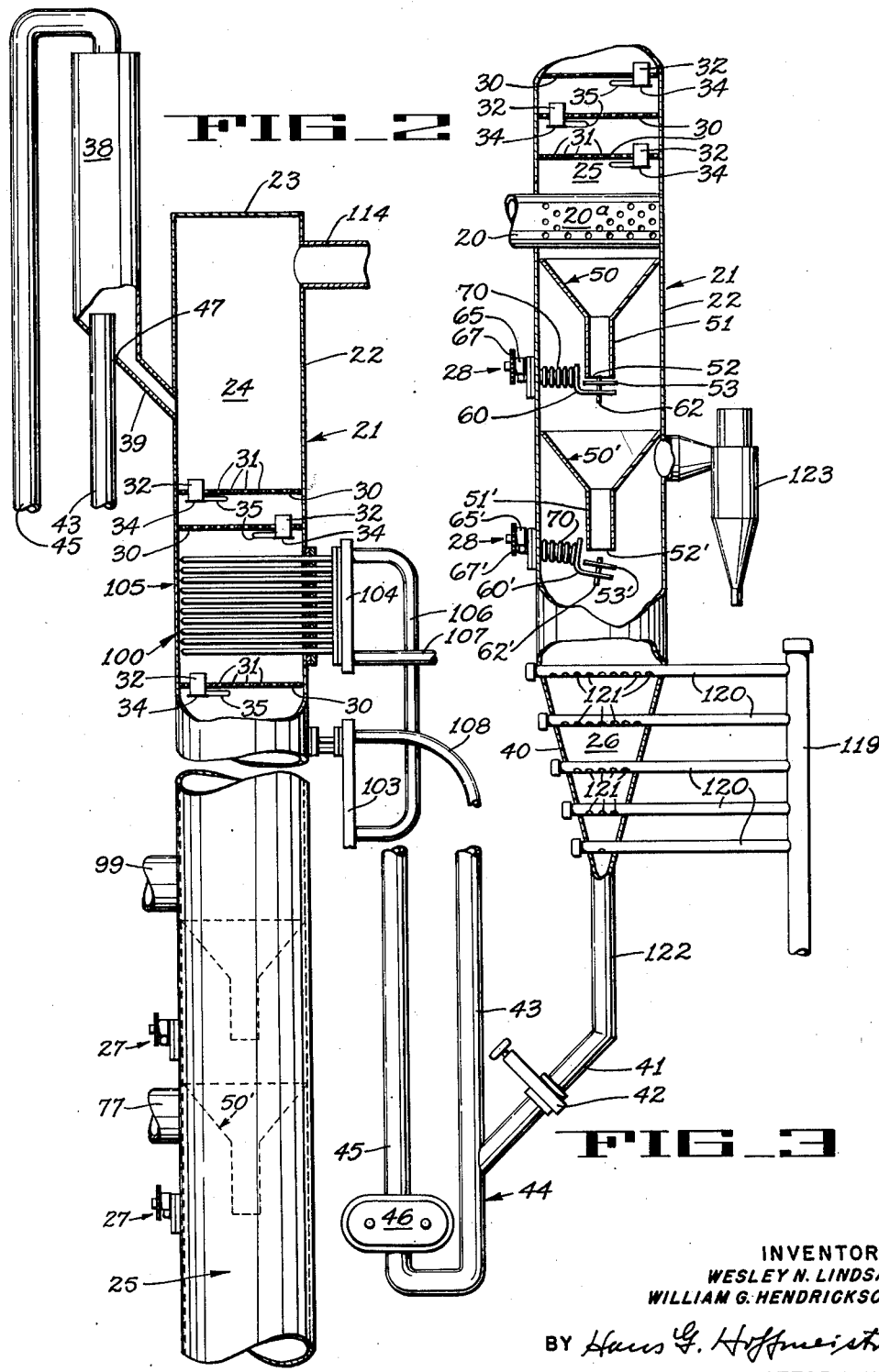

April 6, 1954 W. N. LINDSAY ET AL 2,674,338
METHOD AND APPARATUS FOR THE RECOVERY OF
NITROGEN OXIDES FROM GASEOUS MIXTURES
Filed Dec. 2, 1949 6 Sheets-Sheet 3
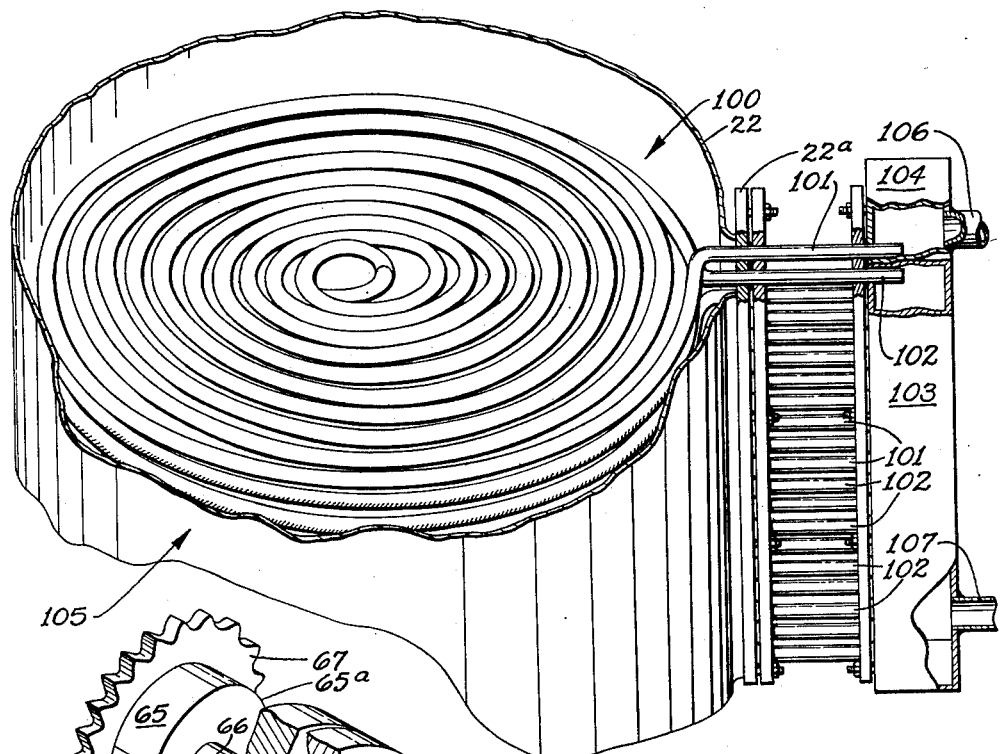
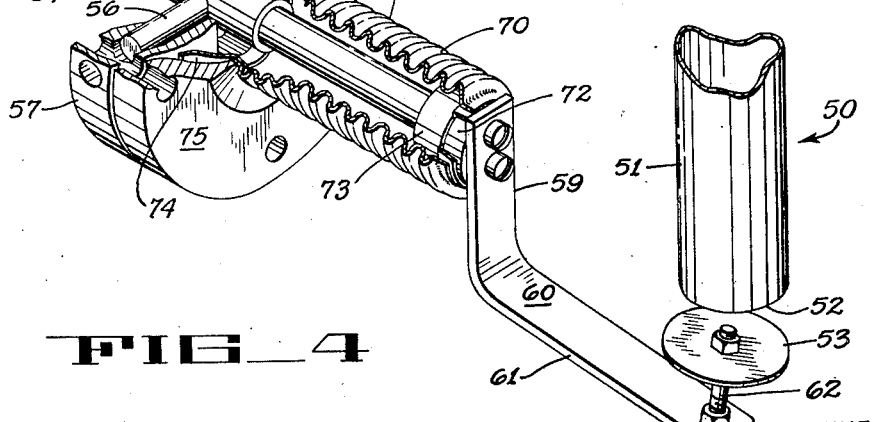
INVENTORS
WESLEY N. LINDSAY
WILLIAM G. HENDRICKSON
BY *Hans G. Hoffmeister*
ATTORNEY

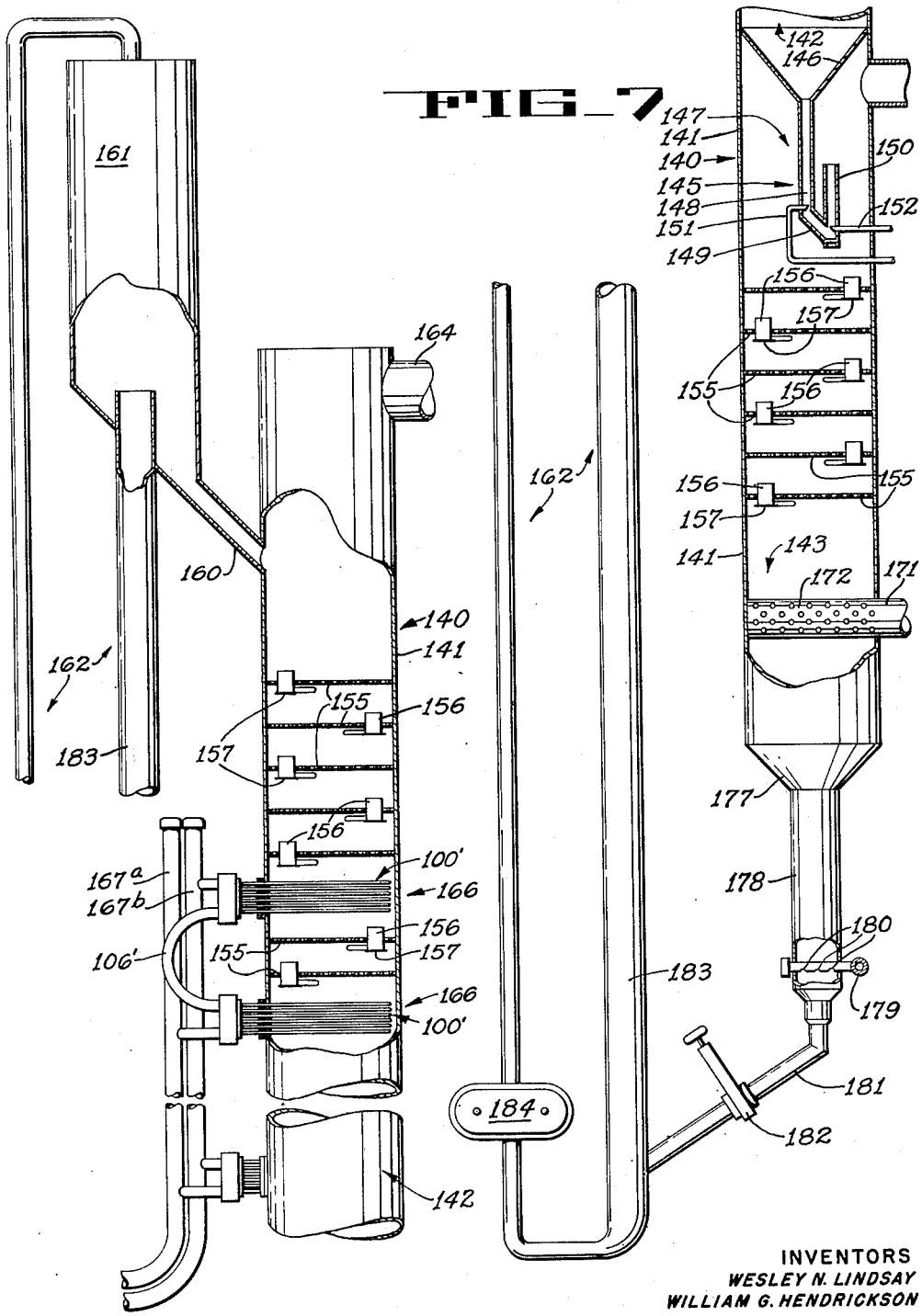

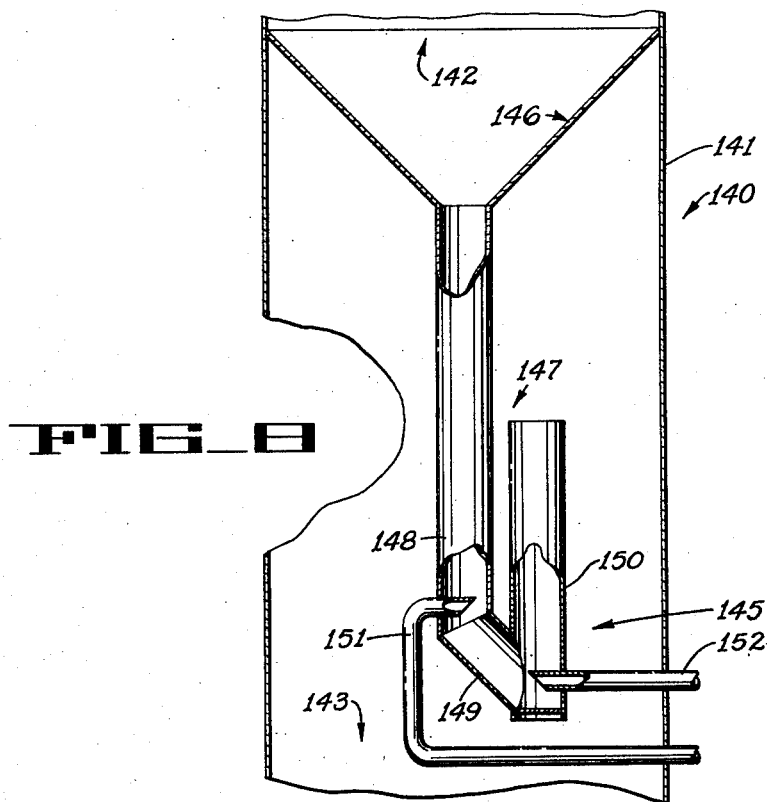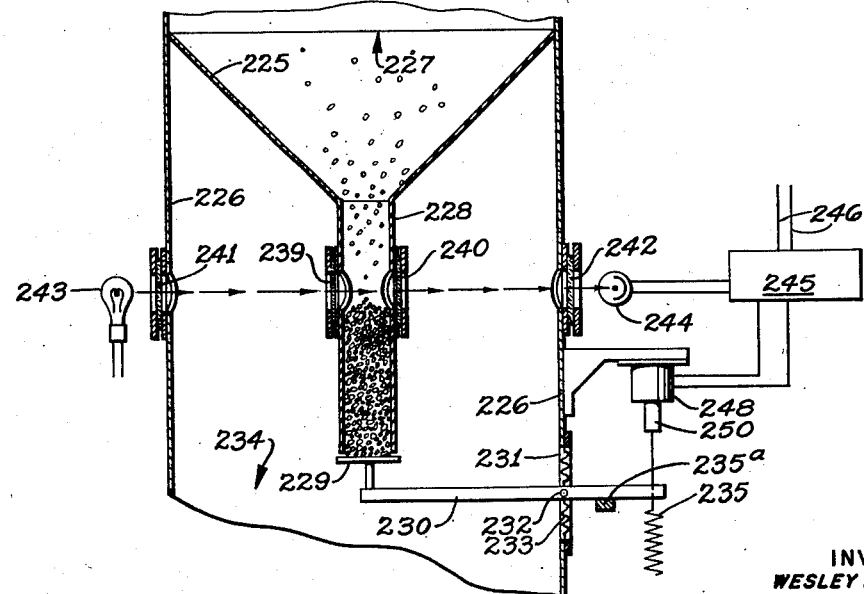

April 6, 1954 W. N. LINDSAY ET AL 2,674,338
METHOD AND APPARATUS FOR THE RECOVERY OF
NITROGEN OXIDES FROM GASEOUS MIXTURES
Filed Dec. 2, 1949 6 Sheets-Sheet 6
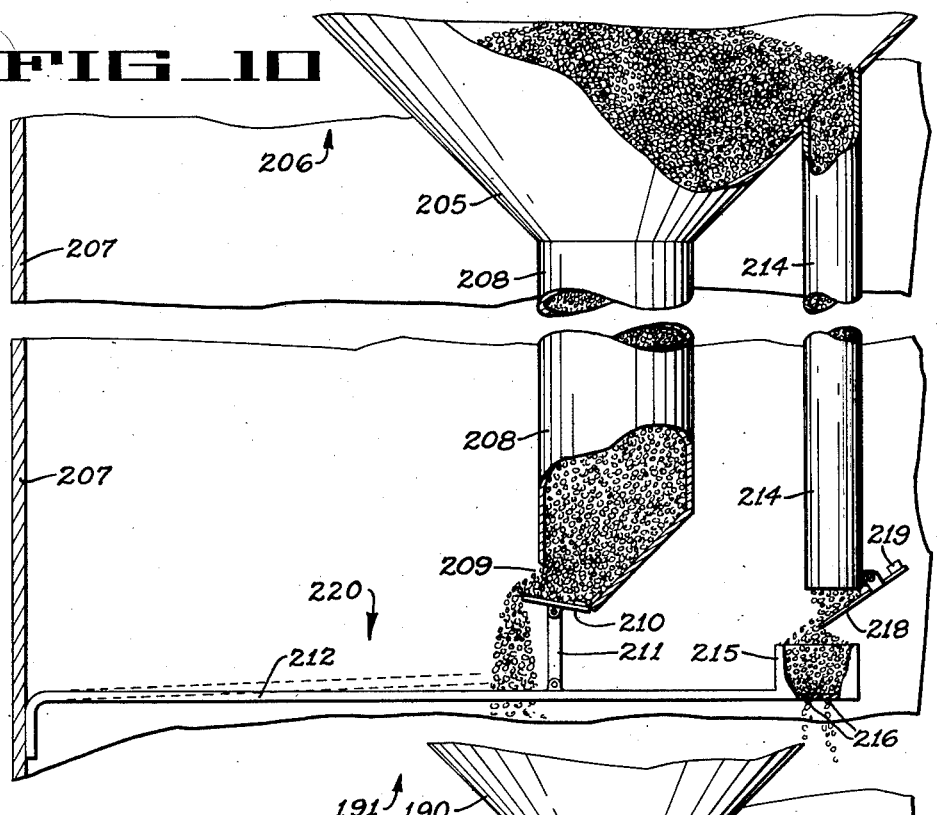
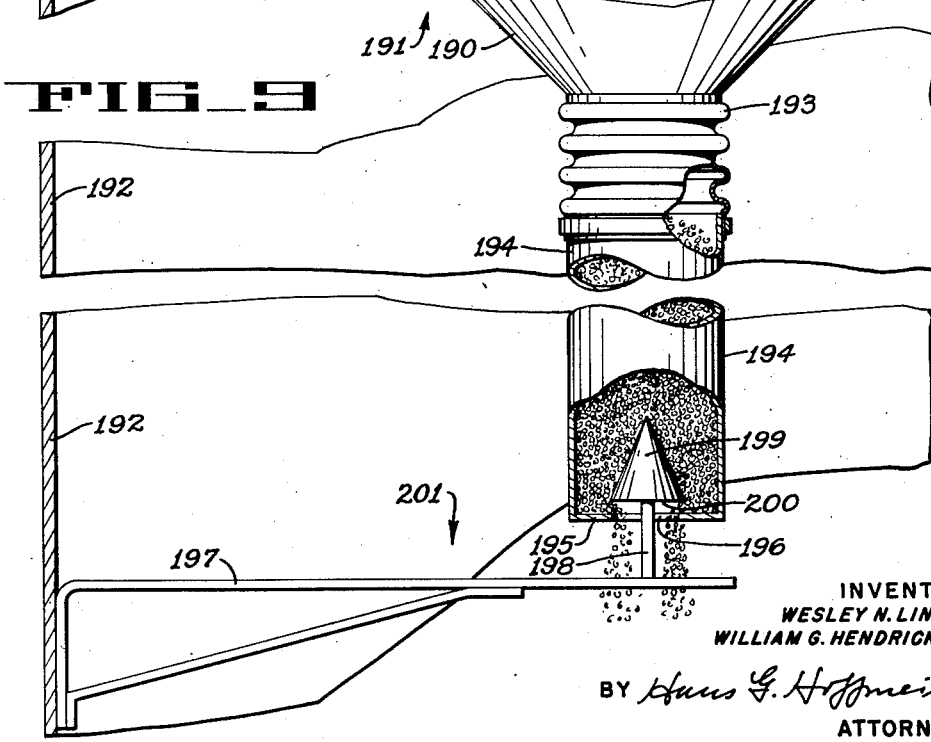
INVENTORS
WESLEY N. LINDSAY
WILLIAM G. HENDRICKSON
BY *Hans G. Hoffmeister*
ATTORNEY Patented Apr. 6, 1954

2,674,338

UNITED STATES PATENT OFFICE 2,674,338

METHOD AND APPARATUS FOR THE RECOVERY OF NITROGEN OXIDES FROM GASEOUS MIXTURES

Wesley N. Lindsay and William G. Hendrickson, San Jose, Calif., assignors to Food Machinery and Chemical Corporation, San Jose, Calif., a corporation of Delaware Application December 2, 1949, Serial No. 130,738

20 Claims. (Cl. 183—4.1)

The present invention relates to methods and apparatus for the recovery of nitrogen oxides from a gaseous mixture. In methods of manufacturing nitrogen oxides which involve the direct fixation of atmospheric nitrogen, such as the Wisconsin nitrogen fixation process or the electric arc process the resulting nitrogen oxides are diluted in large quantities of nitrogen, oxygen, carbon dioxide, water vapor, etc., and amount to less than 3% of the total mixture. It is necessary to isolate the nitrogen oxides contained in the gaseous mixture to obtain them in concentrated form for practical utilization. This is a difficult task and may increase the cost of the final product to an extent where its manufacture is economically impracticable.

It is an object of the present invention to provide an economically feasible method and apparatus for the recovery of nitrogen oxides from gas mixtures of the type referred to.

One process used to recover nitrogen oxides in concentrated form from the aforementioned gas mixture comprises as a first step the elimination of the water vapor component of said gas mixture while the nitrogen oxides are largely in the form of nitric oxide (NO). Since nitric oxide is a difficultly condensible gas, it is adsorbed only to a minor degree by silica gel and similar adsorbents which readily adsorb the easily condensible water vapor. Hence, for removing the water content from the gas mixture without appreciably affecting its nitric oxide content, said gas mixture may be conducted through stationary beds of silica gel, activated alumina or like materials which preferentially adsorb water. Such stationary beds of adsorbent material have many disadvantages and limitations. First of all, since the capacity of adsorbent materials to take up moisture is strictly limited it is necessary to recondition the beds periodically by the application of heat to drive off the adsorbed moisture, which means that the desired adsorption process must be interrupted. To operate a nitrogen recovery process without interruption it has, therefore, been proposed to provide each recovery system with a plurality of moisture adsorbent beds, so that one may always be available for drying the moisture laden gases while others are treated to recondition them for renewed use. Another disadvantage of stationary beds is the fact that after an initial period of effective operation they fail to fully remove the water vapor component from the passing gas mixture, although they may still be far from being saturated with moisture; hence for effective performance the beds may have to be reconditioned before their ability to adsorb water has been fully exploited, which means poor adsorption efficiency. To improve the adsorption efficiency of stationary bed arrangements it has been proposed to pass the gas mixture sequentially through a succession of adsorbent beds so that the water vapor not adsorbed by the first bed or beds may be dependably removed in subsequent beds, and said first bed or beds need therefore not be withdrawn from the process until they are fully saturated with moisture. To keep such an arrangement effective, it is necessary that the saturated beds at the gas entrance end must, upon reconditioning, be switched to the gas exit end of the row of beds. Arrangements of this type provide continuity of operation and high adsorption efficiencies, but involve costly duplication of equipment and complex pipe connections. Still another disadvantage of stationary beds is poor thermal efficiency. To remove the heat generated by the adsorption process and thus keep the beds at a temperature at which adsorption proceeds favorably it is necessary that coolant-conducting pipes be embedded in the adsorbent material. Thus, whenever a bed must be reconditioned, it is not only the adsorbent material but also the cooling pipes that must be heated to effect release of the previously adsorbed moisture.

In view of these evident disadvantages of stationary bed arrangements it has heretofore been proposed to move granular adsorbent material in a continuous manner through a system containing three fixed stations at which said adsorbent material is sequentially contacted with (1) the gas stream from which the vapor is to be removed, (2) a gaseous heating medium which heats the moisture laden adsorbent material and thus causes desorption of the adsorbed vapor and (3) a gaseous chilling medium which cools the heated material to the proper temperature level at which it will again effectively perform as an adsorbent. A system of this type achieves continuity of operation and high adsorption efficiency without duplication of equipment, complex pipe connections or the need for continuous servicing, and with greatly improved thermal efficiency since the cooling pipes in the adsorber station may always remain cool. A major disadvantage of such a moving-bed system, however, is that the permissible velocity of the gas stream passing through the beds is relatively low and may rarely be higher than one foot per second, because the pressure drop through the bed rises steeply as the velocity of the gas stream is increased which in turn increases the pumping costs rapidly to an uneconomically high level. With low gas velocities, however, apparatus of enormous dimensions are required to handle large volumes of gas and in addition the transfer of heat from the gas to the surfaces of the cooling pipes becomes highly inefficient.

It is another object of this invention to provide a process and apparatus for removing a condensible constituent from a gas mixture on an economical basis which combines the desirable features of moving beds of the type referred to with the advantages derived from high gas velocities.

In particular it is an object to provide a system of the type referred to, which is distinguished by efficient utilization of the heat transfer surfaces, high adsorption efficiency and conspicuous reduction in the size of the necessary equipment, without corresponding increase in the cost of operation.

In accordance with our invention we contact a granular adsorbent material countercurrently with the gas stream in a manner causing dense phase fluidization of said granular material, and are thus able to pass the gas through the adsorbent material at relatively high velocities without requiring more than ordinary pumping charges, while at the same time securing the necessary residence time of the solid material. This can not be achieved, however, by employing the type of fluidization of granular materials that is widely practiced in the petroleum art since the fineness of the particles commonly used would prohibit such gas velocities as we prefer to use to economically adsorb a condensible constituent from large volumes of gases at a rapid rate, for at such velocities granular material of the fineness commonly employed is carried along with the gas stream instead of traveling countercurrently thereto.

It is yet another object of the invention to arrange a contacting process of the type referred to in a manner that allows the velocity of the gaseous fluid to be raised to a level permitting large volumes of said fluid to be processed in a minimum of time and within a relatively small space, without jeopardizing proper counterflow of the comminuted solids.

In accordance with the invention we employ, in the processes of the type here contemplated, comminuted adsorbent material of a particle size between the particle sizes used in the previously described fixed or moving bed systems and those commonly used in fluidized systems. We prefer to employ spherical granules with a maximum diameter of the order of $\frac{1}{8}$ of an inch and a minimum diameter of $\frac{1}{32}$ of an inch, or particles with corresponding settling velocities. While such large particles have not proven suitable in the deep fluidized beds commonly used in the petroleum art, because they tend to channel or boil unevenly, we have found that they will fluidize smoothly in relatively shallow beds of the order of one to two inches in depth, and in accordance with the present invention we, therefore, contact the gas stream and a comminuted solid adsorbent of the above stated particle size in continuous counterflow in many superposed fluidized beds of shallow depth and in this manner obtain intimate contact of the required duration between the adsorbent material and the gas stream with superficial gas velocities of the order of five feet per second (measured under standard conditions) while retaining proper counterflow of the comminuted solids, so that large volumes of gas may now be handled at a rapid rate in apparatus of reasonable dimensions.

It is another object of the invention to provide an apparatus for contacting gaseous fluids with granular solids in the manner of dense phase fluidization which accomplishes all three of the previously mentioned operational phases of (1) adsorption, (2) desorption and (3) cooling within a single self-contained unit that is of reasonable dimensions.

Furthermore, it is an object to provide an apparatus of the type referred to which comprises separate processing chambers within a common enclosure, wherein the comminuted solids are permitted to pass from upper to lower ones of said chambers and yet any exchange of gases or vapors between said chambers is effectively inhibited.

Still another object is to provide a subdivided apparatus of the type referred to, wherein said comminuted solids are permitted to pass from higher to lower processing chambers, while any exchange of gases between said chambers is effectively inhibited, and yet the attrition of said comminuted solids as they pass from chamber to chamber is kept at a minimum.

An additional object is to equip an apparatus, of the type referred to, with simple and effective means for re-cycling the comminuted solids from the bottom to the top thereof with a minimum of attrition.

Still another object is to provide an apparatus, of the type referred to, which forms a self-contained unit wherein the granular solids are continuously reconditioned and re-cycled for renewed use without being at any time subjected to the hazards of contamination presented by exposure to the outside atmosphere.

Additionally it is an object of the invention to arrange an apparatus, of the kind characterized, in such a manner as to maintain near isothermal conditions in its adsorption chamber.

Still another object of the invention is to provide automatically acting valving mechanisms for use between the individual chambers of an apparatus, of the type described, which while effectively inhibiting the exchange of gases between said chambers, permit continual flow of the comminuted solids from higher to lower chambers without contributing appreciably to the attrition of said comminuted solids.

The temperature of the gases discharging from a nitrogen fixation furnace is usually of the order of 500° F. At such a temperature the solid adsorbents hold almost no adsorbed water vapor. For the contemplated adsorption of the water vapor component from said gases to proceed effectively, it is therefore necessary that said gases be first properly cooled. On the other hand, the reconditioning process of the adsorbent material requires the application of heat to evaporate the adsorbed moisture. The present invention aims to obtain both the reconditioning of the adsorbent material and the cooling of the furnace gases at a minimum of cost, and accordingly arranges the steps of the process in such a manner that the heat of the gases as they leave the nitrogen fixation furnace is employed to recondition the adsorbent material used in drying said gases. For this purpose the hot furnace gases are first contacted with moisture containing adsorbent material to cause evaporation of the moisture. The additional water vapor taken up by the hot furnace gases in this manner must be eliminated from said gases before they are contacted with the dry granules of adsorbent material for the actual drying operation. For this purpose the moisture laden gases are contacted with a stream of a cooling liquid, such as water, which lowers their temperature and, as a result thereof, causes condensation of the major portion of the water vapor contained therein. Contact of the furnace gases with water tends to deprive said gases of a portion of the valuable nitrogen oxides because the nitrogen dioxide contained in the furnace gases reacts with the water to form nitric acid which dissolves in the cooling water and would go to waste therewith.

It is yet another object of our invention to arrange the described cooling and vapor condensation treatment of the furnace gases so that there will be no appreciable loss of the nitrogen dioxide contained in said gases.

In accordance with the invention this is achieved by continuously re-employing the same cooling liquid and by continually evaporating part thereof so as to maintain its quantity substantially constant in spite of the quantities of liquid that are continuously added thereto by the condensation of part of the water vapor contained in the furnace gases. This causes the nitric acid content of the liquid to reach quickly a point of equilibrium at which it is unable to further deprive the gases of any appreciable quantities of nitrogen dioxide.

For this purpose the cooling liquid is cycled through a cool dry gas which does not only evaporate an adequate portion thereof but also maintains its temperature at a low level and thus preserves its effectiveness as coolant.

It is an additional object of the invention to arrange the described cooling and vapor condensation treatment of the furnace gases and the associated reconditioning process of the cooling liquid employed so that evaporation of the cooling liquid by contact with its gaseous reconditioning medium is the only outlet for the moisture removed from the furnace gases; in other words, in accordance with the invention the described cooling and vapor condensation treatment of the furnaces gases and the associated cooling and evaporation process of the cooling liquid are so related to one another that the amount of cooling liquid evaporated by contact of said liquid with its gaseous reconditioning medium is substantially equal to the amount of liquid condensed from the furnace gases and added to the cooling liquid as a result of contact of said furnace gases with the cooling liquid.

After the effluent gases of a nitrogen fixation furnace have been dried in the manner set forth, they are exposed to catalyzers, such as carbon, silica gel or certain metal oxides that effectively promote oxidation of the nitrogen oxides contained in said gases into nitrogen dioxide; and the nitrogen dioxide thus formed is thereafter isolated from the remaining gases by contacting the gas mixture in the cold condition with a comminuted solid absorbent, such as granular silica gel. The required contact between the gas mixture and the comminuted adsorbent may again be effected in a contacting apparatus, of the type referred to, which is adapted to provide consecutively within a unitary enclosure, adsorption of the nitrogen dioxide from the gas mixture onto the solid adsorbent, desorption of the nitrogen dioxide from said adsorbent for the purpose of recovering it in concentrated form, and cooling of the adsorbent to increase its effectiveness in extracting the nitrogen dioxide from the gas mixture.

It is another object of the invention to provide a contacting apparatus, of the type referred to, wherein the above mentioned three operational phases of adsorption, desorption and cooling may be effectively carried out in only two processing chambers.

An additional object is to arrange a nitrogen oxide recovery system so that the residual gas mixture, after it has been stripped of its nitrogen dioxide content, is employed to cool the comminuted solids in either or both, the gas drying apparatus and the nitrogen-dioxide adsorption apparatus.

These and other objects of our invention will be apparent from the following description of the accompanying drawings, which illustrate certain preferred embodiments thereof and wherein:

Figure 1 diagrammatically represents a nitrogen oxide recovery system arranged in accordance with the invention;

Figures 2 and 3 are fragmentary cross-sectional views showing the gas drying apparatus employed in the system of Figure 1 on a somewhat larger scale;

Figure 4 is a fragmentary perspective of the actuating means for the valving mechanism which separates the individual chambers of the apparatus illustrated in Figures 2 and 3;

Figure 5 is a perspective of a heat exchanger coil, such as is used in the adsorber chamber of the apparatus illustrated in Figure 2;

Figures 6 and 7 are fragmentary sectional views, similar to Figures 2 and 3, of the nitrogen-dioxide adsorption apparatus employed in the system of Figure 1.

Figure 8 is a sectional detail view illustrating, on a somewhat larger scale, the valving mechanism employed in the apparatus illustrated in Figure 7;

Figures 9, 10 and 11 are sectional detail views, similar to Figure 8, illustrating modified embodiments of valving mechanisms, such as may be used in the apparatus shown in Figures 2, 3, 6 and 7.

Figure 1:
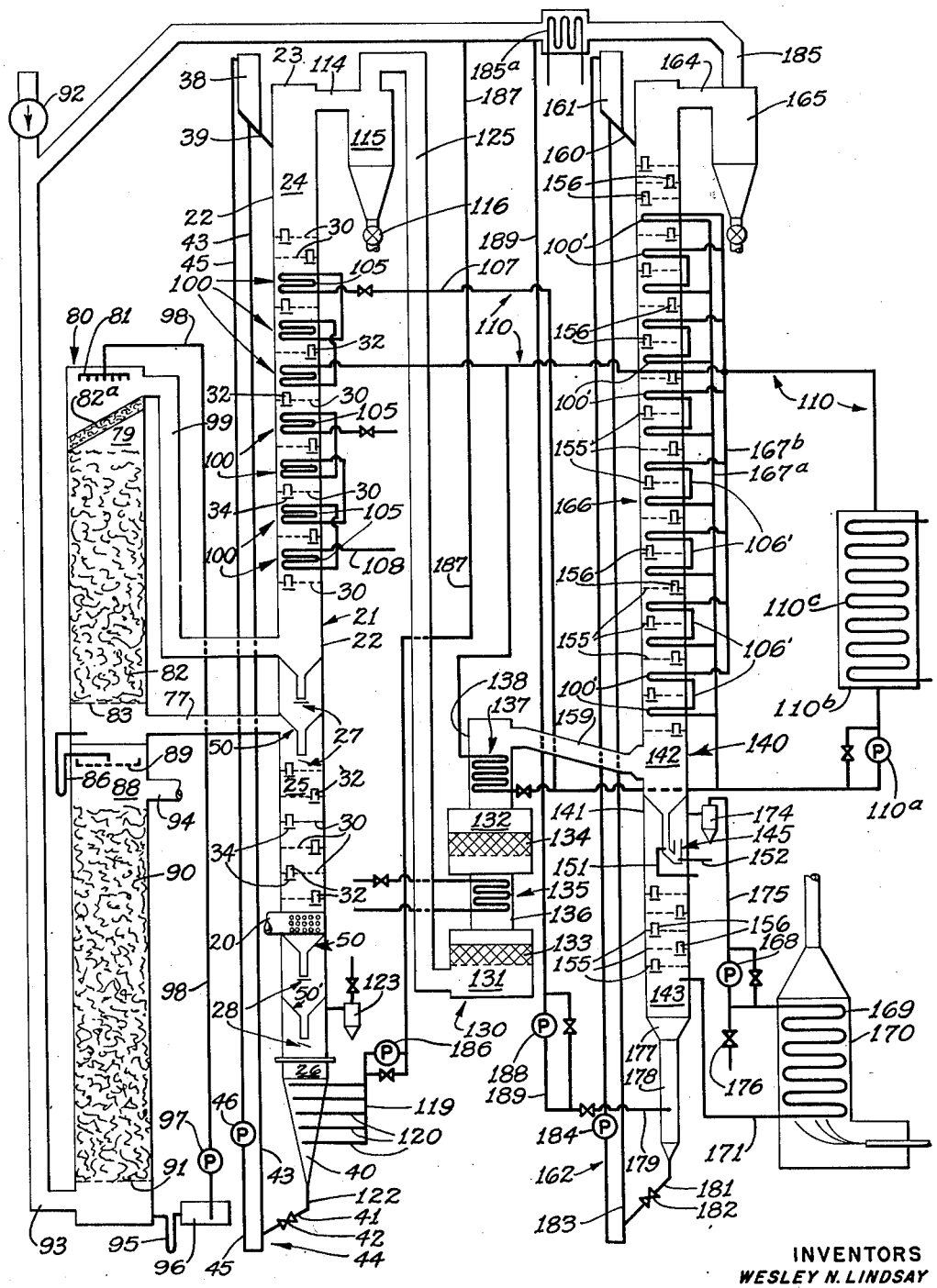

Referring to Figure 1, the effluent combustion gases of a nitrogen fixation furnace are conducted through a pipe 20 into a tubular tower 21 where they are to be stripped of their content of water vapor. Said tower comprises an outer tubular wall 22 which is closed at the top as indicated at 23. The space within said tubular wall is subdivided into three vertically superposed processing chambers, 24, 25 and 26 by two valving mechanisms 27 and 28, respectively, which are adapted to pass granular solids while preventing the exchange of gases that may circulate within the individual processing chambers. Said valving mechanisms may be of varying constructions, as will be described in greater detail hereinafter. The chambers 24 and 25 are provided with a plurality of vertically spaced, horizontal plates 30 which are perforated, as indicated at 31 (Figures 2 and 3). Tubular downspouts 32 extend through each of said plates, with the spout of each two superposed plates preferably located at diametrically opposite points, as shown. Said spouts may extend a limited distance above their respective plates, and their downwardly projecting lower ends are provided with suitable lids 34 (Figure 2) that are yieldably held in a closed, or nearly closed, position by means of spring members 35.

In the case of the exemplary embodiment of the invention that we are about to describe, the granular solids employed to dry the furnace gases may for example be silica gel of a particle size averaging from about ⅛ to ₃₂ of an inch in diameter. Said granular solids are delivered into the tower 21 from a hopper-shaped container 38 through an inclined passage 39, which leads into said tower at its upper end above the uppermost one of the perforated plates 30, and after said granular solids have passed downwardly through all three of the chambers 24, 25 and 26, they collect in the funnel shaped bottom 40 of said tower from where they are discharged through an inclined conduit 41, controlled by a valve 42, into the ascending run 43 of an air lift circuit 44, the descending run 45 of which contains a suitable blower 46. The blast of air produced by said blower 46 lifts the discharged granules within said ascending run 43 to the aforementioned hopper 38. Said hopper is sufficiently larger in diameter than the conduit that forms the ascending run of the air lift circuit to permit expansion, and thus cause deceleration, of the air blast produced by the blower 46 to an extent where it can no longer support the entrained granules of silica gel. Said granules, therefore, drop upon the sloping floor 47 of said hopper 38, from where they slide down the previously described inclined passage 39 and enter the tower 21 anew. The air delivered into the hopper 38 by the blower 46 is returned to the imput opening of said blower by the conduit 45.

It will be understood that other means than the hopper-shaped container 38 may be employed within the spirit of our invention for separating the granules from the air current circulating within the described air lift circuit.

As previously indicated, each pair of superposed chambers 24, 25 and 25, 26, respectively, are separated from one another by a valving mechanism which is adapted to permit the granular solids to flow from higher to lower chambers but inhibits the exchange of gases that may be circulating in the individual chambers. Having reference to Figure 3, the valving mechanism 28 may comprise an upper funnel 50 which forms the bottom of the upper chamber 25, being suitably secured to the wall 22 of the tower 21, as shown. Said funnel has a downwardly directed tubular extension 51 and positioned a limited distance below the open bottom end 52 of said tubular extension is a lid 53 which is arranged to move alternately farther away from or nearer to said open bottom end 52. For this purpose the wall 22 of the tower 21 possesses an aperture at about the level of said lid 53 and extending through said aperture into the interior of the enclosure 22 is an actuating lever 55 (Figure 4) which swings on a horizontal pivot 56 that extends transversely across, and is mounted in, a collar 57 arranged at the outside of the enclosure wall 22. Secured to the inner end of the lever 55 is the vertical arm 59 of an L-shaped bracket 60. The horizontal arm 61 of said bracket 60 supports a vertical stem 62 which carries the aforementioned lid 53. The outwardly directed end of the lever 55 is provided with a cam follower roller 64 which is held against the edge of a cam 65 by the weight of the components supported from the inner end of said lever 55. Said cam has the form of a mutilated disc and is rotatably supported upon a horizontal shaft 66 which is mounted in the aforementioned collar 57. Integral with the disc 65 is a gear or sprocket 67 that may be driven from a suitable source of power (not shown). Whenever rotary power is applied to said gear or sprocket 67, rotation of the cam 65 oscillates the lever 55 about the pivot 56, as its roller 64 is successively engaged by the circular segment 65a and the mutilated segment 65b of said cam, and the lid 53 supported from the inner end of lever 55 will accordingly be cyclically withdrawn or returned to its position near the open end of the tubular funnel extension 51. To permit free oscillation of the lever 55 within the aperture of the enclosure 22 and yet prevent any of the gases in the interior of said enclosure from escaping through said aperture, a tubular bellows 70 is placed around said lever 55. The closed inner end of said bellows is held between a boss 72 projecting from the outwardly directed face of the vertical bracket arm 59, and the extended inner end 73 of the lever 55; and the open outer end of said bellows is designed to form an outwardly turned flange 74 which is clamped between the inner face of the aforementioned collar 57 and a washer 75 placed against the outer face of the enclosure wall 22.

Disposed concentrically below the funnel 50 and its lid 53 is a second funnel 50' of like construction which forms the ceiling for the lower chamber 26 (Figure 3) and possesses a lid 53' arranged a limited distance below the open bottom end of its downwardly directed tubular extension 52'. Means are provided to oscillate lid 53' away from and back to its position adjacent to the bottom end 52' of the funnel tube 51' in the same manner as the lid 53 is oscillated away from and back to a position adjacent to the bottom opening 52 of the funnel tube 51, and the means employed to impart the described movement to said lid 53' may be identical in construction with the means employed to oscillate the lid 53, as indicated in Figure 3, where corresponding components of the two mechanisms are designated by the same reference numerals, with the reference numerals of the lower actuating mechanism especially identified by apostrophes. Both said actuating mechanisms may be driven from the same source of power, but the rotary position of the control cams 65 and 65' relative to one another should be displaced by an angle of 180 degrees so that the two mechanisms may operate in phase opposition; that is to say: whenever the upper lid 53 is moved closer to the opening of the funnel tube 51, the lower lid 53' should move away from the opening of the funnel tube 51' and vice versa. As a result thereof, granular solids from the upper chamber 25 will be permitted to flow through the upper funnel 50 into the lower funnel, while said lower funnel is substantially closed, and may shortly thereafter escape through said lower funnel into the lower chamber 26, while the upper funnel is substantially closed. Thus, the described mechanism causes the granular solids to flow continually in two stages from the upper to the lower chamber, without establishing at any time an unobstructed path through which the gases circulating in the individual chambers might freely communicate with one another.

In practice, we prefer to so arrange the described mechanism that the lids will at no time close the bottom openings of their respective funnels completely, but will in their "closed" positions be spaced from said bottom ends by a distance at least equal to the largest dimension of the granules employed. We have found that such an arrangement reduces the attrition rate of the granules materially, since there is no possibility for the granules to be crushed or sheared between the ends of the funnel tubes and the lids, and yet no appreciable exchange of gases can occur between the separate processing chambers, for even when a lid is slightly spaced from the end of its respective funnel tube, there will be no flow of granules from the interior of said tube, provided the lid is large enough to fully support the pile of granules spreading from the end of the funnel tube at the angle of repose. As a result thereof sufficient granules will accumulate within the funnel tubes, even though they may not be fully closed, to form a seal that is effective to prevent any rush of gaseous fluids through the valving mechanism. To insure that such a seal has formed in a funnel that has just completed an "open" phase, before the other funnel is opened up, the described lid actuating mechanism may be so arranged that its "open" phases are markedly shorter than its "closed" phases, so that the "closed" phases of the two cooperating lids will overlap to an appreciable extent. Having reference to Figure 4, it will be apparent that the angular width of the mutilated cam segment 65b which corresponds to an "open" position of the lid is only about 120 degrees, while the angular width of the circular cam segment 65a which corresponds to a "closed" position of the lid is about 240 degrees. With the cams 65 and 65' (Figure 3) operating in phase opposition, this means that after each "open" position a lid will be in a "closed" position over a period of time corresponding to rotation of the cam through an angle of 60 degrees before the other lid is withdrawn to open its respective funnel.

As previously indicated the apparatus illustrated in Figures 2 and 3 is especially designed to serve as a drier for gaseous fluids. To this end its uppermost chamber 24 is arranged to house the actual moisture adsorbing process; that is to say, in this chamber the descending granules of adsorbent material are contacted with the moisture laden gases, which are caused to rise through said chamber, for a sufficiently long period of time to enable them to fully adsorb the water vapor contained in said gaseous fluids, while steps are taken to maintain such a low temperature in said chamber as will maintain said adsorption process at a high efficiency. The lower chambers 25 and 26 serve to recondition the spent adsorbent for renewed use; that is to say, in the middle chamber 25 the drenched granules of adsorbent material are contacted with a hot gaseous fluid to raise their temperature and thus drive off the adsorbed moisture, and in the third and lowest chamber 26 the dried granules are cooled by contacting them with a gaseous chilling medium so as to lower their temperature to a level at which they perform effectively as adsorbents.

In practically utilizing the apparatus of the present invention in a system for the recovery of nitrogen oxides from the effluent gases of a Wisconsin nitrogen fixation furnace, we prefer to first conduct the hot combustion gases into the middle chamber 25 in order that their heat may be utilized to drive the moisture from the "spent" silica gel granules that enter said chamber from the adsorber chamber 24 through the valving mechanism 27. As previously indicated, the furnace gases are conducted into the tower 21 through a pipe 20 which delivers them into the chamber 25 through a distributor head 20a located at the bottom of said chamber (Figure 3), from where they rise in many currents through the perforated bed plates 30 against the descending stream of solid adsorbent granules toward the ceiling of said chamber as formed by the lower funnel 50' of the valve mechanism 27, to discharge through an exhaust conduit 77 provided at the upper end of said chamber (Figures 1 and 2).

By means of a suitable blower (not shown) which is arranged to control the velocity of the combustion air delivered into the furnace, the velocity of the gas currents rising within the chamber 25 may be adjusted to a value at which the granular solids delivered into said chamber through the valving mechanism 27 are maintained in a state of dense phase fluidization on and above the various perforated bed plates 30 provided in said chamber, with a limited portion thereof spilling continually into the down spouts 32 from where they are permitted to flow into lower beds. Thus, the solid granules of adsorbent material may be made to reach the bottom of the chamber 25 after having been in intimate contact with the rising currents of the hot furnace gases for a sufficient period of time to cause evaporation of previously adsorbed moisture, so that the granules collecting in the upper funnel 50 of the lower valving mechanism 28 are thoroughly dry while the moisture released from their pores is entrained in, and escapes with, the furnace gases through the exhaust conduit 77.

In passing through the processing chamber 25 the furnace gases have cooled materially. For instance, gases that may have entered the chamber 25 at a temperature of say 400° F. may have cooled to a temperature of about 250° F. This, however, is still too hot to permit effective adsorption of their moisture, should they be contacted with the dry solid adsorbent that passes through the uppermost processing chamber of the tower 21. The exhaust conduit 77 is therefore arranged to conduct the moisture laden gases into the upper chamber 79 of a tower 80 (Figure 1) where they are subjected to a shower of a cooling liquid, such as water, brine or the like. For this purpose a liquid distributor 81 is provided in the upper end of said chamber 79, and the conduit 77 is arranged to discharge the moisture laden furnace gases into said chamber 79 at the lower end thereof so that they may rise within said chamber against the shower of cooling liquid that issues from said liquid distributor 81. To establish intimate contact between the cooling liquid and the rising gases the chamber 79 may be packed with Raschig rings, Berl saddles, crushed granite or the like as indicated at 82, which rest upon a grate 83 provided above the inlet port of pipe 77. In passing upwardly through the chamber 79 in the tower 80 the moisture laden furnace gases are cooled by contact with the cooling liquid dispensed from the distributor 81. For instance, gases entering the chamber at a temperature of, say, 250° F. may be cooled to a temperature of about 80° F. and as a result thereof a portion of the water vapor contained in said gases is condensed and collects with the cooling liquid at the bottom of chamber 79 from where it may be discharged through a liquid seal or gas trap 86 into a suitable place of disposal, such as a sewer. However, in employing the apparatus of the invention for cooling and drying the effluent combustion gases of a nitrogen fixation furnace, preparatory to recovering the nitrogen oxide content of said gases, we prefer to continuously re-employ the liquid for cooling the furnace gases in order to maintain loss of nitrogen oxides in the cooling chamber at a minimum. For instance, in case of water being used as a cooling medium, the nitrogen dioxide contained in the furnace gases reacts readily with the cooling water to form nitric acid that dissolves in, and would go to waste with the cooling water. However, if the cooling water is continuously re-employed, its nitric acid content will quickly reach a point of equilibrium whereupon it will be unable to further deprive the furnace gases of any appreciable quantities of nitrogen dioxide.

For this purpose the liquid collecting at the bottom of the cooling chamber 79 may be conducted through the liquid seal or gas trap 86 into a reconditioning chamber 88 provided in tower 80 below the cooling chamber 79 (Figure 1) where another liquid distributor 89 located in the upper end of said chamber distributes the liquid over another suitable packing 90 that rests upon a grate 91 and is effective in establishing intimate contact between said liquid, as it flows through said packing, and a rising stream of dry cool gas. Said gas may be delivered into chamber 88 from a blower 92 through a pipe 93 entering said chamber near its bottom end and may escape into the outside atmosphere through a discharge pipe 94 arranged at its upper end. The cooled liquid collecting at the bottom of the reconditioning chamber 88 is drained through another liquid seal or gas trap 95 into an exteriorly positioned vessel such as a surge tank 96, from where a suitable pumping mechanism 97 returns it through an ascending conduit 98 to the liquid distributor 81 of the upper chamber 79. The arrangement is preferably such that the dry gaseous chilling medium sweeping through the reconditioning chamber 88 evaporates, and carries off, such a portion of the liquid descending through said chamber that the total amount of the liquid cooling medium circulating through the tower 80 remains substantially the same.

The furnace gases leave the cooling chamber 79 through a conduit 99 provided at the upper end thereof, and to limit the amount of water spray that may be carried along in said gases, as they leave the cooling chamber, a pad or filter of a suitable material such as glass fibres may be arranged above the packing 82, as indicated at 82a.

While passing through the cooling chamber the furnace gases lose some of their humidity, but they are still far from dry and must now be processed in the adsorber chamber 24 of the tower 21 to be thoroughly freed from moisture. For this purpose the conduit 99 leads the cooled gases into said adsorber chamber 24 at the bottom end thereof, from where they rise in many currents through the perforations 31 in the bed plates 30 (Figure 2), while a stream of cold, dry granules of a solid adsorbent, such as silica gel or activated alumina pours into said chamber from the hopper 38 forming a fluidized bed on each of said plates 30, with said granules descending gradually through the spouts 32 from the top to the bottom of the chamber 24 in a manner previously described. Thus, the granular adsorbent and the furnace gases are intimately contacted with one another for a sufficient period of time to enable said adsorbent to adsorb practically all of the moisture contained in said gases.

While both the furnace gases and the solid adsorbent should be adjusted to a sufficiently low temperature before entering the adsorption chamber 24, for the desired adsorption process to proceed effectively, the adsorption process involves condensation, and therefore releases heat in itself which raises the temperature of the adsorbent material and thus impairs the effectiveness of the drying process. Such a temperature increase is especially harmful in the upper regions of the adsorber chamber, where the vapor content of the processed gases has dropped to a very low level, so that low temperatures are of critical importance to enable the solid adsorbent to remove the last traces of moisture from the gases. In accordance with the invention we therefore provide heat exchangers between the bed plates of the adsorber chamber 24 to constantly remove the heat generated by the adsorption process, and we so arrange matters that the gases are cooled to a lower temperature in the upper region of the adsorption chamber.

Having reference to Figures 1 and 2, a battery of pipes 100, each coiled in the manner of a horizontally positioned double spiral of an over all diameter to fit the interior of the tower 21 (Figure 5), is provided in all but the uppermost one of the chamber sections formed between the superposed bed plates 30. The two ends 101 and 102 of each of said pipes 100 protrude in parallel relation through a suitable tube sheet 22a of the tower wall 22 and connect with vertically disposed inlet and outlet manifolds 103 and 104, respectively. Said manifolds flank each but the uppermost one of said chamber sections, at a sufficient distance from the tower wall 22 to permit any moisture, that may leak from said manifolds and may tend to spread along the outside of the pipe ends 101, 102, to evaporate before it can reach and penetrate into the interior of the tower 21. The individual turns of each of the spirally wound pipe coils 100 are slightly spaced from one another in radial direction to provide openings through which the descending stream of granular solids may pass, and as many as ten such spirally wound pipe coils may be arranged in closely spaced superposed relation within a single chamber section, as shown at 105 in Figure 2.

In the particular refrigeration system illustrated in Figures 1 and 2, the upper end of the outlet manifold 104 of each pipe battery 105 is connected by a joint pipe 106 to the lower end of the inlet manifold 103 of the next lower pipe battery, and the cooling fluid enters the system through a supply pipe 107 at the lower end of the inlet manifold 103 of the uppermost pipe battery 105 and is exhausted from said system through an exhaust pipe 108 connected to the upper end of the outlet manifold 104 of a lowermost pipe battery. In this manner the upper sections of the adsorber chamber 24, wherein the granular adsorbents must be effective to free the rising furnace gases from traces of moisture, are serviced by the cooling medium in its freshest and hence most effective condition. To accentuate the difference in cooling provided in the upper and lower chamber sections still further, the heat exchanger system formed by the many superposed pipe batteries 105 may be subdivided into two or more separate refrigeration circuits (Figure 1), with the upper circuits arranged to conduct more effective cooling media than the lower circuits. Thus, water from an ordinary pressure line may be passed through the pipe batteries in the four lowest chamber sections, while an especially refrigerated cooling water may be employed in the pipe batteries provided in the three uppermost chamber sections. For this purpose the manifolds of the three uppermost coil batteries may be connected into a closed refrigerated water circuit 110 which includes a pump 110a that circulates the water continuously through a reconditioning tank or reservoir 110b within which is immersed a chilling coil 110c that may form a part of a Freon compressor circuit (not shown).

The intimate contact between the rising furnace gases and the descending stream of granular solids under the temperature conditions thus established in the adsorber chamber 24, is effective to remove practically all the water vapor from said gases. Thus, in a chamber having no more than eight fluidized beds of the type described, the dew point of nitrogen oxide containing gases discharged from a Wisconsin nitrogen fixation furnace may be reduced from, say 80° F. to as low as −60° F.

The dry furnace gases leave the adsorber chamber 24 at the top end thereof through a conduit 114 which passes them through a cyclone 115 (Figure 1), wherein the granules of adsorbent material that may have been entrained in said gases, are retained and from which said granules may be recovered for renewed use through a valve 116 provided at the bottom end thereof in order to keep the loss of adsorbent material at a minimum. The moisture laden granules that reach the bottom of the adsorber chamber 24, however, pass through the previously described valve 27 into the regenerator chamber 25 where they are freed from the moisture accumulated in their pores by contact with the hot furnace gases, as previously explained. From said regenerator chamber the dry granules pass through the valve 28 into the bottom chamber 26, where they are contacted in the form of a moving bed with a gaseous chilling medium to restore their effectiveness as adsorbents. In the particular embodiment of the invention as illustrated in Figures 1 and 3, the lower portion 40 of the chamber 26 is shaped in the manner of a slender cone, and arranged exteriorly of said cone is a vertically positioned intake manifold 119 provided with a plurality of horizontal branch pipes 120. Said branch pipes extend through the bottom portion 40 of the chamber 26 and interiorly of said chamber each of said branch pipes is provided with a plurality of downwardly directed apertures 121 through which cool, dry air may be introduced into the chamber 26. Said air rises against the descending bed of granules and adsorbs their heat, so that the granules passing into the downwardly directed tubular extension 122 of the cone-shaped tower bottom 40 are properly cooled. From said tubular extension 122 the downwardly moving bed of cool, dry granules slides along the previously mentioned inclined passage 41 into the ascending branch 43 of the air lift circuit 44 to be returned through hopper 38 to the upper end of the drying tower 21 as previously explained, while the air introduced through the pipes 120 is allowed to escape into the outside atmosphere through a cyclone 123, which is located at the upper end of the chamber 26 directly below the lower funnel 50′ of the valve 28, and is adapted to retain any granules of adsorbent material that may be entrained in said cooling air. It will be understood that while we have described the cooling process in the lowermost chamber 26 as occurring with the granules passing through said chamber in the form of a downwardly moving bed, said chamber 26 may also be provided with a plurality of superposed perforated plates similar to chambers 24 and 25, and the necessary contact between the solid granules and the gaseous chilling medium may occur in the form of numerous superposed fluidized beds.

The above described tower 21 is a self-contained drier unit wherein moist gases may be effectively dried with the aid of a relatively limited quantity of a continuously recycled granular adsorbent. Due to the fact that the granular adsorbent is contacted with the gases in the form of numerous fluidized beds, and due to the relatively large size of the granules employed, which permits the gases to be delivered into the tower with a velocity of the order of five feet per second (measured in unobstructed parts of the tower at 60° F. and a pressure of 1 atmosphere) without impairing proper counterflow of the solid adsorbent, the drying is effected in a minimum of space so that apparatus of relatively small dimensions are adapted to handle large volumes of gases where apparatus of five times the size were formerly necessary. Thus, in an apparatus constructed in accordance with our invention which has an overall height of only 35 feet and a diameter of only 14 inches, with 9 bed plates provided in the adsorber chamber and 6 bed plates provided in the regenerator chamber and which operates in conjunction with a cooling tower of the type described hereinbefore, it is possible to dry the moist effluent gases of a Wisconsin nitrogen fixation furnace at a rate of 330 cubic feet per minute from a dew point of 80° F. to a dew point of −60° F. As an added advantage of great importance we have found that contrary to expectations the relatively large size of the granules employed and the high velocity of the gas currents made possible by the use of granules of such size does not appreciably increase the attrition rate of the adsorbent material beyond the attrition rate encountered with the dust like particles that are commonly employed in the previously known fluidized contacting processes; and due to the nature of the valving mechanisms provided in accordance with the invention between the individual chambers of the drier tower, and also due to the closed air lift circuit employed in conjunction with said tower the attrition rate of the granular solids is generally exceedingly low, and the possibility of contamination of the adsorbent material is held at a minimum.

After the cool and dry nitrogen oxide containing furnace gases have passed through the cyclone 115, a conduit 125 carries them to another processing station 130, where they are treated to catalyze the oxidation of the nitric oxide into nitrogen dioxide. For this purpose the furnace gases are passed from below through a sequence of superposed processing chambers 131 and 132, each containing a bed 133 and 134, respectively, of granules of a suitable catalyzer, such as activated charcoal or adsorbent silica gel, which may be from 4 to 6 inches in height and about 30 inches in diameter with the individual granules being preferably of a size passing through a 4 to 6 mesh screen. These catalyzer beds operate continuously and without need for reactivation. However, the oxidation of nitric oxide into nitrogen dioxide promoted by said beds releases considerable amounts of heat, and a battery of heat exchanger coils 135, similar in construction to the coil batteries 105 within the adsorber chamber 24 of tower 21 and connected to a water line may therefore be provided in the tubular conduit 136 which leads from the lower catalyzer chamber 131 to the upper catalyzer chamber 132. Similarly, another battery of cooling coils 137 connected into the previously described refrigerated water circuit 110 may be provided in a tubular conduit 138 arranged at the discharge end of the upper catalyzer chamber 132, through which the furnace gases leave said upper catalyzer chamber, so that the furnace gases are thoroughly cooled before they are conducted into another processing tower 140 (Figures 6 and 7) which is similar in construction to the previously described drier tower 21, and wherein the gases are to be contacted with another stream of a granular adsorbent material in order to isolate the nitrogen dioxide content of the gas mixture from the remaining components thereof.

The nitrogen dioxide adsorber tower 140 is of tubular shape and comprises an outer wall 141; and although it houses three different processing zones, its interior is divided into only two separate chambers 142 and 143 by means of a valving mechanism 145 which is adapted to pass granular solids while inhibiting the exchange of gases between the chambers, and which may be of the same construction as the valving mechanisms 27 and 28 of tower 21, or may be of the construction indicated in Figure 1 at 145, and illustrated in greater detail in Figure 8.

The modified valving mechanism 145, illustrated in Figure 8 comprises a funnel 146 which is suitably secured to the cylindrical wall 141 of the tower 140, with its diverging end forming the bottom of the upper processing chamber 142. Said funnel has the usual tubular funnel extension 147, as shown, but while said tubular extension has an initial downwardly directed run 148, its lower end is turned sideways to form a laterally sloping run 149 which, in turn, is bent upwardly in the manner of a knee to form an upwardly directed terminal run 150 that discharges into the lower processing chamber 143 at a level substantially below the entrance point of the tubular funnel extension. A duct 151 of small diameter leads into the downwardly directed run 148 of the funnel tube 147 in the region where it passes into the laterally sloping center run 149, and is arranged to conduct a small amount of the gaseous fluid passing through the upper chamber 142 into said tube, while another duct 152 of small diameter leads into the tube 147 in the region where its terminal run 150 rises from the laterally sloping center run 149, and is arranged to conduct a limited quantity of the gaseous fluid passing through the lower processing chamber 143 into said tube 147.

In operation the granules descending through the upper processing chamber 142 are gathered in the funnel 146 and flow into the downwardly directed run 148 of the tubular funnel extension. The gas stream injected through the duct 151 into said downwardly directed run at the bottom end thereof is not strong enough to blow the granules back into the upper processing chamber, but it is sufficiently strong to keep the descending granules in fluid suspension. Hence, the granules drop through the downwardly directed run of the tube 147 in a loose condition, and thereafter slide along its laterally sloping center run 149 to its lowest point, where the gas stream injected into the funnel tube 147 through the duct 152 maintains them in such a loose condition as will enable them to rise with said second gas stream through the upwardly directed run 150 of the funnel tube to the upper end thereof, from where they spill into the lower processing chamber 143 in much the same manner as a liquid flowing from an upper level through an inverted knee-shaped tube of the type described. Thus, the granular solids dropping through the tower 140 may pass in continuous flow from the upper processing chamber 142 through the described valving mechanism 145 into the lower processing chamber 143, without the possibility for any appreciable exchange of gases between the individual processing chambers for the gas stream injected into the tube 147 through the duct 151 returns to the upper chamber through the initial run 148 of said tube while the gas stream injected into the tube 147 through the duct 152 returns to the lower chamber through the terminal run of said tube, with the relatively dense mass of granules sliding down its sloping center run 149 through what is a doldrum region between the above mentioned gas currents forming a satisfactory gas-separating seal.

The upper and larger one of the two chambers into which the processing tower 140 is divided by the above described valving mechanism 145 possesses eighteen superposed bed plates 155, as shown in Figure 1, which may be of the same construction as the bed plates 30 of the dryer tower 21 having down spouts 156 the lower ends of which are yieldably closed by lids 157, as may be seen from Figure 6 and 7. A conduit 159 introduces the cool nitrogen-dioxide-containing furnace gases into said upper processing chamber at its bottom end, as shown in Figure 1, from where they may rise through the perforations in the plates 155 against a descending stream of granular solids that have a preferential adsorbability for nitrogen dioxide, such as silica gel, adsorbent carbon, or titania gel. Said granular adsorbents are preferably again of a size ranging from about $\frac{1}{32}$ to $\frac{1}{8}$ of an inch in diameter, and enter the tower 140 in an endless flow at its upper end through an inclined passage 160 from a hopper-shaped container 161 that forms part of an air lift circuit 162 which may be of the same construction as the air lift circuit 44 that is associated with the drier tower 21. As a result of the intimate contact established by the described arrangement between the rising furnace gases and the descending stream of granular adsorbent in the form of eighteen superposed fluidized beds, said granular adsorbent extracts the nitrogen-dioxide content from said gases, with the nitrogen-dioxide-laden particles passing through the described valving mechanisms 145 into the lower chamber 143 while the nitrogen-dioxide-denuded gases escape from the chamber 142 through a conduit 164 at the upper end thereof which passes them through a cyclone 165 to recover what granules of adsorbent material may be entrained therein.

While the nitrogen dioxide containing gases conducted into the chamber 142 at the bottom end thereof are properly cooled due to the effect of the cooling coil battery 137 in the tubular chamber 136 as previously described, the nitrogen dioxide adsorption process releases considerable amounts of heat, and to maintain the granules of adsorbent material in the adsorber chamber 142 at a suitably low temperature at which the adsorption process will progress favorably, batteries of heat exchanger coils 166 are interposed between all but several of the uppermost bed plates 155, as shown in Figures 1 and 6. The coiled pipes 100' of said batteries may be of the same construction as the coiled pipes 100 of the heat exchanger batteries 105 in the adsorber chamber 24 of the drier tower 21 but in order to establish isothermal conditions within the chamber 142 of the nitrogen dioxide recovery tower 140 the bed plates 155 in said last mentioned chamber may be spaced from one another to a lesser degree than the bed plates 30 of chamber 24, so that the individual sections of chamber 142 are of lesser vertical depth than the corresponding sections of chamber 24; and the heat exchanger batteries 166 provided within the sections of chamber 142 will therefore comprise a smaller number of coiled pipes than the batteries 105, such as shown in Figure 6, wherein each battery 166 comprises only six superposed pipe coils 100'. As in the case of the heat exchanger batteries 105, the individual pipe coils 100' of each heat exchanger battery 166 are connected across inlet and outlet manifolds that flank each pipe battery in parallel pairs, and which are spaced from the outer wall 141 of the tower 140 by a distance adequate to cause evaporation of any liquid that may leak from said manifolds, before it can spread along the outer surfaces of the pipe ends and seep into the interior of the tower 140. All of the heat exchanger batteries in chamber 142 are preferably connected into the previously mentioned refrigerated water system 110 and for this purpose may be arranged in pairs that are suitably interconnected by pipes 166', with each such interconnected pair being shunted across vertically positioned inlet and outlet mains 167a and 167b, respectively (Figure 6), that, in turn, are connected across the previously described circulating pump 110a and the reconditioning tank 110b of the refrigerated water system 110 (Figure 1).

As previously indicated, the nitrogen-dioxide-laden granules of adsorbent materials pass through the valving mechanism 145 into the lower processing chamber 143. There they are heated by contact with a hot gaseous fluid to cause release of the adsorbed nitrogen dioxide. In order that the nitrogen dioxide may be recovered in a relatively concentrated form, hot nitrogen dioxide, or a gas mixture comprising a large portion of nitrogen dioxide, is preferably employed for this purpose. Having reference to Figure 1, a continuously operating gas pump 168 drives a suitably quantity of a gaseous heating medium through a heat exchanger coil 169 where it is heated to an appropriate temperature, such as for instance 400° F. The heat exchanger coil 169 may be heated in any suitable manner, but for reasons of economy we prefer to employ the heat of the effluent combustion gases of the nitrogen fixation furnace for this purpose. To this end the afore-mentioned conduit 20 may be arranged to conduct the hot furnace gases through a heating chamber 170 within which the heat exchanger coil 169 is located, before delivering them into the middle chamber 25 of the drier tower 21 as previously described. From the heat exchanger coil 169 the heated fluid is conducted through a conduit 171 into the desorption chamber 143, where it rises from a suitable distributor head 172 provided at the end of the conduit 171 in many currents against the descending stream of nitrogen-dioxide-laden solid adsorbent. To secure such intimate contact between the granules and the hot fluid as will promote proper transfer of heat from the fluid to the granular solids within a minimum of space and time, a suitable number of superposed bed plates 155 are provided in the chamber 143, as shown, to establish the required contact in the form of fluidized beds. After the heating fluid has passed through all the bed plates provided in the desorption chamber 143, it may escape through a cyclone 174 which retains any entrained particles of adsorbent material. From the cyclone 174, said fluid is returned through a conduit 175 to the inlet of the gas pump 168 which sends it anew through the heat exchanger coil 169 and the adsorber chamber 143. As the granules descending through the chamber 143 are heated by contact with the heating fluid, they release the previously adsorbed nitrogen dioxide in gaseous form which increases the quantity of the stream of gaseous fluid circulating through the desorption chamber and the heat exchanger coil. A relief valve 176, arranged to open at a predetermined pressure, is provided at a suitable point of the described circulatory system, as shown in Figure 1, and as the pressure prevailing in said system increases due to the increase in quantity of fluid circulating therein, said valve 176 opens and permits part of the fluid to leave the system. Depending upon the nature of the gaseous heating fluid initially employed, the excess fluid bled from the described system through the relief valve 176 constitutes more or less concentrated nitrogen dioxide which may be conducted to a condenser to be liquified, or into a water tower for conversion into nitric acid.

The vertical length of the desorption chamber 143 and the number of fluidized beds established therein, should be so chosen in relation to the temperature at which the desorbing fluid is held by the heating chamber 170, that the cool nitrogen-dioxide-laden granules which enter through the valve 145 are thoroughly heated to the proper desorption temperature in descending through the chamber 143, so that a maximum portion of the nitrogen dioxide adsorbed in the upper chamber 142 is released from said granules before they reach the funnel-shaped bottom end 177 of said chamber 143. Some traces of nitrogen dioxide may, however, still be retained in the pores of the hot granules that slide into the tubular extension 178 of the funnel 177, and a small amount of a gaseous purging fluid, such as air, may therefore be continuously introduced into the funnel tube 178 at the bottom end thereof through an inlet pipe 179 that is provided with a number of discharge openings 180, as shown in Figure 7. In rising within the funnel tube 178 in close contact with the descending granules of adsorbent material, said fluid sweeps the last traces of nitrogen dioxide from said granules and joins the stream of gaseous desorption fluid that circulates through the desorption chamber 143, as previously described. By properly proportioning the amount of purging fluid introduced into the chamber 143 through the funnel tube 178, the degree of concentration of the nitrogen-dioxide-containing gas mixture, recovered from the desorption chamber 143 through the relief valve 176 may be maintained at a selected level, such as for instance 30%.

From the tubular extension 178 of the funnel 177 the denuded granules of adsorbent material slide through an inclined passage 181, controlled by a valve 182, into the ascending branch 183 of the previously mentioned air lift circuit 162, wherein the blast from a blower 184 raises them to the hopper 161, from where they slide through the aforementioned passage 160 into the upper end of the processing tower 140.

The granules of adsorbent material, thus returned to the upper end of the processing tower 140, are still hot from contact with the hot desorption fluid and, though relieved from the previously adsorbed nitrogen dioxide, they are therefore still incapable of adsorbing the nitrogen dioxide content from the furnace gases that continuously rise through the upper chamber 142 of the processing tower 140. Means must therefore be provided to cool said granules to the proper temperature level at which they perform effectively as adsorbents, before they come into contact with furnace gases that contain significant quantities of nitrogen dioxide. For this purpose the upper chamber 142 of the tower 140 is materially longer and possesses a considerably greater number of bed plates and heat exchangers than the corresponding chamber 24 of the drier tower 21 (Figure 1). With the intimate contact established in the lower region of said chamber 142 between the cool nitrogen dioxide containing furnace gases rising from below and the solid adsorbents descending from the top, said gases will have been stripped of practically all the nitrogen dioxide originally contained therein, by the time they have negotiated about three quarters of the height of chamber 142. By extending the height of chamber 142 beyond the distance required for adsorbing substantially all of the nitrogen dioxide originally contained in the gases, we establish a zone above the nitrogen dioxide adsorption zone of said chamber, wherein the descending particles of adsorbent material are appropriately cooled by being contacted on the five uppermost plates 155 of the chamber 142 in the form of fluidized beds with the cool and substantially nitrogen-dioxide-free furnace gases that continuously rise from below. Thus, in accordance with our invention the self-reconditioning nitrogen-dioxide-recovery unit constituted by tower 140 is so arranged that its three phases; i. e. (1) adsorption of the nitrogen dioxide, (2) desorption of the nitrogen dioxide and (3) cooling of the granules of adsorbent material, are accomplished in only two processing chambers so that only one of the valves 145 is required.

The denuded furnace gases, having been employed to cool the descending granules of adsorbent material in the upper zone of chamber 142, are extremely dry and may effectively be used to assist in reconditioning the cooling liquid employed in the previously described cooling tower 80. For this reason a conduit 185 may be arranged to conduct said gases from the cyclone 165 at the top of tower 140 through an additional heat exchanger 185a may be directed by the previously described conduit 93, through which the aforementioned blower 92 delivers the gaseous cooling medium into the cooling-liquid-reconditioning chamber 88 of said tower 80. In addition a portion of the dry gases discharged from the upper end of tower 140 and passed through the heat exchanger 185a may be directed by a gas pump 186 through a branch line 187 into the manifold 119 which delivers them through the many branch pipes 120 into the bottom chamber 26 of the drier tower 21, where they may act as cooling and drying media for the granules of adsorbent material employed in said tower 21. Besides, another gas pump 188 may be arranged to direct a small quantity of the dry gases discharged from the nitrogen-dioxide-adsorption chamber of tower 140 through another branch line 189 and the aforementioned inlet pipe 179 into the funnel tube 178 at the bottom of the nitrogen dioxide desorption chamber 143, where they will rapidly heat up due to contact with the hot granules of adsorbent material descending through said tube, and thus heated will act as purging fluid for said granules in the manner previously described.

As previously pointed out, the problem of housing the several phases of a contacting process, of the type referred to, in superposed relation within a common enclosure, such as is realized in the towers 21 and 140, hinges largely on the task of separating the individual processing chambers in such a manner from one another that, while the solid granules are still allowed to pass from the higher to the lower chambers with such ease as to maintain attrition at a minimum, exchange of gaseous fluids between the individual chambers is effectively inhibited, for if any appreciable exchange of gases between the individual chambers were to take place, the processes maintained in said chambers would be seriously interfered with, if not entirely defeated. Thus, the adsorption process maintained in the uppermost chamber 24 of the dryer tower 21 would be materially impaired, if any of the moist, hot gases passing through the center chamber 25 were to penetrate into said adsorption chamber; and similarly the efficiency of the nitrogen dioxide recovery process performed in the lower chamber 143 of tower 140 would greatly drop, if the hot nitrogen dioxide containing fluid circulating through said chamber would penetrate into the adsorption chamber 142. The valving mechanisms 27, 28 and 145, described in connection with the towers 21 and 140, respectively, perform effectively in the required manner, and permit a practically continuous flow of the granular solids from upper to lower chambers without danger of shearing or crushing the granules, and yet effectively prevent any appreciable exchange of gases between said chambers.

Another valving mechanism that may be effectively employed in the towers 21 and 140, in place of the valving mechanisms 27, 28 and 145, respectively, is illustrated in Figure 9. It comprises an inverted cone 190 which forms the bottom of an upper processing chamber 191, being suitably secured to the wall of the common enclosure 192. Suspended from the open center of said cone 190 by means of an elastic tubular bellows 193 is a tube 194, the bottom end of which is provided with an inwardly directed flange 195 that leaves a circular center aperture 196. A bracket 197 secured to the wall of the enclosure 192 extends to a point below the bottom end of the tube 194. Said bracket carries a stem 198 that protrudes upwardly through the aperture 196 into the interior of the tube 194 where it supports a small cone 199, the circular base 200 of which is of a somewhat larger diameter than the aperture 196.

With no, or only a small amount of, granular material within the tube 194, the bellows 193 is arranged to hold said tube with its annular flange 195 in such a position relative to the stationary cone 199 that there can be no flow of granules from the tube 194 into the lower chamber 201. For this purpose it is not necessary that the tube 194 be raised to a point, where its annular flange 195 is in contact with the base 200 of the cone 199. In fact, we prefer to so arrange matters that with the tube 194 in its uppermost position, its annular flange 195 is spaced from the base 200 of the cone 199 by a distance at least equal to the maximum dimension of the granules employed, because in such a case there is never any possibility for granules to be scraped or crushed between the base of the cone and the edge of the annular flange, whatever the operational position of the mechanism may be; yet with the flange only slightly spaced from the base of the cone, as described above, no granules will flow from the tube, provided the flange is of sufficient radial width to fully support the inwardly inclined conical slope of granules determined by the periphery of the base 200 of cone 199. However, as soon as an adequate amount of granules has accumulated within the tube 194, to form an effective seal therein against the free passage of gases, the weight of said granules lowers the position of the tube against the resiliency of the bellows 193, and thus shifts the slope of granules beyond the inner edge of the flange 195, so that the granules will commence to flow into the lower chamber 201, as illustrated in Figure 9. The upwardly converging conical shape of the lid member 199, as shown, is conducive to facilitate relative movement of tube and lid member away from one another against the mass of granules that may have accumulated within said tube, and thus increases the sensitivity of the described valving mechanism. As soon as the supply of granules from the upper chamber 191 into the funnel 190 is interrupted, and the quantity of granules within the tube 194 drops below a predetermined weight, the resiliency of the bellows 193 is effective to restore the tube 194 with its flange 195 to its initial position, at which there is no flow of granules from the tube 194, before the plug of granules within said tube has had a chance to empty completely into the lower chamber 201. During practical operation, when granular solids flow in a continuous stream into the funnel 190, the described arrangement will adjust itself to a position, where granules will flow from the tube 194 at substantially the same rate at which they are delivered into the funnel 190, with an adequate quantity being at all times within the tube 194 to provide an effective seal against the flow of gases.

Figure 10 illustrates another valving mechanism that may be employed in a multi-phase contacting apparatus of the type described. It comprises a funnel 205 which forms the bottom of an upper processing chamber 206, being suitably secured to the common enclosure 207 of an apparatus of the type referred to. Said funnel has a centrally positioned tubular extension 208, the lower end of which is non-symmetrically contracted, as shown, to form a somewhat laterally directed bottom opening 209 which may be of rectangular shape. Hinged to the lower lip of said opening is a lid 210, that in turn is hingedly supported by means of an interponent 211 from an intermediate point of a horizontal bar 212 which is secured to the wall of the enclosure 207. An overflow pipe 214 of a materially smaller diameter than the funnel tube 208 extends from a selected point in the conical wall of the funnel 205 in downward direction and terminates above a cup 215, that is supported upon the free end of the bar 212 and which has a number of apertures 216 provided in its bottom. The bar 212 is of resilient material, such as steel, and the arrangement is such that ordinarily said bar maintains the lid 210 in an elevated position, wherein it closes or nearly closes the opening 209, and thus blocks the flow of granules from the funnel tube 208. An additional lid 218 may be hingedly secured to the lower end of the pipe 214 and may be biased in any suitable manner, such as by means of a counter weight 219, to close or nearly close the bottom opening of said pipe.

In operation the granules descending into the funnel 205 accumulate in said funnel (and its tubular extension 208) until they reach the level of the port through which the funnel communicates with the overflow pipe 214, whereupon a portion of the descending granules will flow into said pipe. As granules collect within said pipe, the lid 218 will soon recede from the bottom opening of the pipe under the weight of the granules accumulated therein, and the granules will flow into and accumulate within the cup 215 underneath, loading said cup to an extent where its weight is effective, due to its position at the free end of the resilient bar 212, to depress said bar and cause the lid 210 to be withdrawn from the bottom of the funnel tube 208. Thus, the granules accumulated in the funnel 205 and its tubular extension 208 are now permitted to flow freely into the lower chamber 220. As a result thereof, the level of granular material within the funnel 205 drops below the inlet port of the overflow pipe 214 so that the flow of granules through said pipe and into the cup 215 will cease, enabling the lid 218 to close the open bottom of said pipe under the influence of the biasing weight 219, or in response to an upward rush of gaseous fluid that may try to sweep through the empty pipe into the upper chamber 206. As previously indicated, the bottom of the cup 215 is provided with a number of holes 216, through which the granular solids deposited therein may gradually discharge into the processing chamber 220; and as they discharge through said holes, the weight that operated the lever 212, is reduced enabling said lever to rise until it finally returns the lid 210 to "closed" position. Now the level of granular material within the funnel 205 may rise again and initiate another cycle in the operation of the described valving mechanism.

For proper performance of the valving mechanism illustrated in Figure 10, the size of the apertures 216 at the bottom of the cup 215 should be so related to the size of the opening 209 at the bottom of the tubular funnel extension 208, that the bar 212 will be permitted to rise and shut the lid 210, while there is still an adequate amount of granular material within the tubular funnel extension 208 to form an effective seal that prevents exchange of the gaseous fluids circulating in the individual processing chambers 206 and 220. To this end the apertures 216 at the bottom of the cup 215 are preferably made adjustable in the manner of the apertures in a salt or pepper shaker.

Figure 11 illustrates still another valving mechanism, that may be employed to separate the individual processing chambers of contacting apparatus, such as the towers 21 and 149. It comprises a funnel 225 that is suitably secured to the enclosure 226 of a processing apparatus of the type referred to, and forms the bottom of an upper processing chamber 227. Said funnel possesses a downwardly directed tubular extension 228, below which is arranged a lid 229 that is mounted upon the end of an actuating lever 230. Said lever extends through an opening 231 provided in the wall of the enclosure 226, and may be pivoted on a stud 232 that extends transversely across said opening and is mounted within the wall of the enclosure. A suitable diaphragm 233 is arranged to close the opening 231 in a manner that will not permit any of the gaseous fluids circulating in the lower processing chamber 234 to escape, and yet will not interfere with the free movability of the actuating lever 230. Suitable spring means 235 engaging the outwardly protruding end of the lever 230 is arranged to urge said lever in clockwise direction, as viewed in Figure 11, into a position determined by a stop member 235a, which places the lid 229 sufficiently close to the lower end of the tubular funnel extension 228 to block the flow of granules from the interior of said tube. At a predetermined level above its lower end the funnel tube 228 possesses two windows 239 and 240 placed at diametrically opposite points circumferentially of said tube, and two additional windows 241 and 242 are provided at diametrically opposite points in the outer wall of the enclosure 226 in line with the windows 239 and 240. A source of radiant energy, such as an electric bulb 243 is placed before the outer window 241, while a light sensitive cell, such as a photo-electric tube 244, is arranged in front of the opposite window 242. Said photo-electric tube forms part of an electric circuit arrangement, represented in Figure 11 by an amplifier 245 and a power connection 246, which includes a solenoid 248, the armature 250 of which is connected to the outer end of the actuating lever 230 and is arranged, upon energization of said solenoid, to pull said lever in counter-clockwise direction against the urgency of the previously mentioned restore spring 235.

In operation a ray of light from the bulb 243 passes through the windows 241, 239, the interior of the funnel tube 228 and the windows 240, 242 and impinges on the light sensitive electrode of the photo-electric tube 244. When said electrode is illuminated it is arranged to interrupt the power supply for the solenoid 248, so that the spring 235 retains the lid 229 in "closed" position; hence, the granules of adsorbent material descending into the funnel 225 from the upper processing chamber 227 will accumulate in the funnel tube 228. As soon as the level of the granular mass within said funnel tube rises to and above the level of the windows 239, 240, however, the ray of light directed against the phototube 244 is interrupted which changes the electroconductive character of said tube in a manner that is arranged to close the power circuit for the solenoid 248. As a result thereof said solenoid is energized and attracts its armature 250 which pulls the lever 230 in counter-clockwise direction against the force of the spring 235 and, thus, withdraws the lid 229 from the bottom end of the funnel tube 228. Hence, the granules collected therein may now freely pass into the lower chamber 234, but as soon as the level of the granular solids within said funnel tube 228 drops below the level of the windows 239, 240, the light ray emitted from the bulb 243 may again impinge upon the light sensitive electrode of the photo-tube 244 enabling said tube to disrupt the power supply of the solenoid 248. In consequence thereof the spring 235 restores the lid 229 to "closed" position and interrupts the flow of granules from the funnel tube 228 at a time when there is still a sufficient quantity of such granules left in said tube to form an effective seal for the gases circulating in the individual chambers 227 and 234. In practice the level of granular solids within the funnel tube 228 will continually oscillate between a position in which it blocks the light beam and a position wherein it does not block the light beam thereby causing the lid 229 to alternate between "open" and "closed" positions in a more or less rapid succession, depending upon the rate at which new granules are delivered into the funnel 225 from the upper processing chamber 227, so that a more or less continual flow of granules from the funnel tube 228 into the lower chamber 234 will result.

While we have explained the methods and apparatus of our invention with the aid of exemplary embodiments thereof, it will be understood that we do not wish to be limited to specific data or constructional details shown or described which may be departed from without departing from the scope and spirit of our invention.

What we claim, is:

1. Apparatus for sequentially contacting solid granules with a plurality of different gaseous fluids, comprising an enclosure, means for delivering granules into said enclosure at the upper end thereof, means for discharging granules from said enclosure at the lower end thereof, partitioning means dividing said enclosure into a plurality of vertically superposed chambers, ducts for delivering different gaseous fluids individually into said chambers at the lower ends thereof, ducts for exhausting said gaseous fluids from said chambers at the upper ends thereof, each of said partitioning means comprising a funnel having a downwardly directed tubular extension, a lid plate disposed below and spaced from the bottom end of said tubular extension by a distance at least as large as the diametrical width of the granules employed, yet sufficiently large in area to fully arrest the flow of said granules from the end of said tubular extension, and means for reciprocating said lid between the above defined position and a position permitting free flow of said granules from the end of said tubular extension, and a plurality of superposed perforated plates provided in at least one of said chambers.

2. A combined adsorption and desorption apparatus adapted to separate a selected component from a mixture of gaseous fluids, comprising an enclosure of predominantly vertical compass, valving means adapted to pass granular solids in downward direction, while inhibiting the interchange of gaseous fluids and arranged to divide said enclosure into a first and second chamber, a plurality of vertically spaced perforated plates provided at least in said first chamber, cooling means provided in said first chamber in spaces between said superposed plates, means for delivering granules of an adsorbent material having a preferential adsorbability for said selected component into said enclosure at the top end thereof, means for conducting the mixture of gaseous fluids to be processed through said first chamber from the bottom to the top thereof against the descending granules of adsorbent material in a manner adapted to form fluidized beds upon the perforated plates in said first chamber to promote adsorption of said selected component from said mixture of gaseous fluids onto said granules, and means for passing a gaseous heating medium through said second chamber against the descending granules to effect desorption of said selected component from said granules, said first chamber being materially extended in height beyond the height necessary to adsorb substantially all of said selected component from said mixture of gaseous fluids and containing vertically spaced perforated plates in said extended portion, so as to provide a zone for cooling the hot granules of adsorbent material discharged from said second chamber in fluidized condition before they contact said mixture of gaseous fluids in a condition in which it still contains said selected component.

3. A combined adsorption and desorption apparatus adapted to separate a selected component from a mixture of gaseous fluids, comprising an enclosure of predominantly vertical compass; valving means adapted to pass granular solids in downward direction, while inhibiting the interchange of gaseous fluids, and arranged to divide said enclosure into an upper and lower chamber, a plurality of vertically spaced perforated plates provided in said chambers; cooling means provided in said upper chamber in spaces between said superposed plates; means for delivering granules of an adsorbent material having a preferential adsorbability for said selected component into said enclosure at the top end thereof; means for conducting the mixture of gaseous fluids to be processed through said upper chamber from the bottom to the top thereof against the descending granules of adsorbent material in a manner adapted to form fluidized beds upon the perforated plates in said upper chamber to promote adsorption of said selected component from said mixture of gaseous fluids onto said granules; and means for passing a gaseous heating medium through said lower chamber against the granules descending from said valve means in a manner adapted to form fluidized beds upon the perforated plates in said lower chamber to promote desorption of said selected component from said granules; said upper chamber being materially extended in height beyond the height necessary to adsorb substantially all of said selected component from said mixture of gaseous fluids and containing vertically spaced perforated plates in said extended portion, so as to provide a zone in said upper chamber for cooling the hot granules of adsorbent material returned from the bottom of said lower chamber to the top of said upper chamber in fluidized condition, before they contact said mixture of gaseous fluids in a condition in which it still contains said selected component.

4. A combined adsorption and desorption apparatus for the recovery of nitrogen dioxide from a mixture with other gases; comprising an enclosure of predominantly vertical compass; valving means adapted to pass granular solids in downward direction while inhibiting the interchange of gaseous fluids and arranged to divide said enclosure into an upper and a lower chamber; a plurality of vertically spaced perforated plates arranged in both of said chambers; cooling means provided in said upper chamber in spaces between said superposed plates; means for delivering granules of adsorbent material having a preferential adsorbability for nitrogen dioxide into said enclosure at the top end thereof, means for conducting the nitrogen dioxide containing gas mixture through said upper chamber from the bottom to the top thereof against the descending granules of adsorbent material in a manner adapted to form fluidized beds upon said perforated plates and thus promote adsorption of the nitrogen dioxide from said gas mixture onto said granules; and means for passing a gaseous heating medium through said lower chamber against the nitrogen dioxide laden granules descending from said valving means in a manner adapted to form fluidized beds upon said perforated plates to promote desorption of the nitrogen dioxide carried by said granules; said upper chamber being materially extended in height beyond the height necessary to adsorb substantially all of the nitrogen dioxide contained in said gas mixture and containing vertically spaced perforated plates in said extended portion so as to provide a zone above the nitrogen dioxide adsorption zone for cooling in fluidized condition the hot granules of adsorbent material returned from the bottom of said lower chamber to the top of said upper chamber by said cycling means.

5. The method of drying hot gaseous fluids which comprises conducting the gaseous fluids along a confined course, contacting said fluids at two separate points of said course with separate sectors of a circulating stream of a solid granular adsorbent in a manner producing dense-phase fluidization of said adsorbent, and contacting said fluids at a point intermediately of said above mentioned points with a cooling medium.

6. The method of drying hot gaseous fluids which comprises conducting the gaseous fluids along a confined course, contacting said fluids at a first point of said course with a sector of a circulating stream of a solid granular adsorbent in a manner producing dense-phase fluidization thereof, then contacting said fluids and said solid granular adsorbent separately with cooling media and thereafter contacting said fluids at a later point of their confined course with another sector of said circulating stream of solid granular adsorbent.

7. The method of drying the hot effluent combustion gases of a nitrogen fixation furnace which comprises conducting said gases along a confined course, contacting said gases at a first point of said course with a sector of a circulating stream of a solid granular adsorbent, such as granular silica gel, in a manner producing dense-phase fluidization thereof, then contacting said gases with a cooling liquid while contacting said solid granular adsorbent with a non-condensible gaseous cooling fluid, and thereafter contacting said gases at a later point of their confined course with another sector of said circulating stream of solid granular adsorbent in a manner producing dense-phase fluidization thereof.

8. The method according to claim 7 comprising the steps of reconditioning said cooling liquid by contacting it with a cool dry gas and continuously re-employing it, upon reconditioning, to cool said gases.

9. The method of isolating the nitrogen oxide component of the effluent gas mixture of nitrogen fixation furnaces, which comprises the following steps (1) conducting said gas mixture through a first sector of a circulating stream of cooling liquid to cool said gas mixture and condense a part of its moisture content, (2) contacting said cooled gas mixture with a stream of a solid granular adsorbent having preferential adsorbability for water to render said gas mixture thoroughly dry, (3) conducting said gas mixture through oxidizing agents to oxidize the nitric oxide contained therein into nitrogen dioxide, (4) again cooling said gas mixture to temperatures at which solid adsorbents are effective, (5) contacting said cooled gas mixture with a stream of a solid granular adsorbent having preferential adsorbability for nitrogen dioxide while maintaining the gas mixture cool to withdraw the nitrogen dioxide from said gas mixture, and (6) conducting the remaining gas mixture through a second sector of said circulating stream of cooling liquid to recondition said cooling liquid for renewed use.

10. The method of isolating the nitrogen oxide component of the effluent gas mixture of nitrogen fixation furnaces, which comprises the following steps: (1) conducting said gas mixture in hot condition through a first sector of a stream of a solid granular adsorbent circulating within a confined zone, and having preferential adsorbability for water, in a manner producing dense-phase fluidization thereof, to heat said granular adsorbents and thus drive off any moisture contained therein; (2) conducting said gas mixture through and countercurrently to a first sector of a stream of a cooling liquid flowing in a confined circuit to cool said gas mixture and condense part of its moisture content; (3) conducting said cooled gas mixture through a second sector of said circulating stream of a solid granular adsorbent in a manner producing dense-phase fluidization thereof, so as to render said gas mixture thoroughly dry; (4) conducting said dried gas mixture through oxidizing agents to oxidize the nitric oxide contained therein into nitrogen dioxide; (5) again cooling said gas mixture to temperatures at which solid adsorbents are effective; (6) conducting said gas mixture through a first sector of a stream of a solid granular adsorbent having preferential adsorbability for nitrogen dioxide in a manner producing dense-phase fluidization thereof, while maintaining said gas mixture cool, to withdraw substantially all of the nitrogen dioxide from said gas mixture, and (7) conducting said residual gas mixture through a second sector of said confined circuit of cooling liquid so as to recondition said liquid for renewed use as a cooling medium.

11. The method according to claim 10, wherein (8) a gaseous heating medium is contacted with a second sector of said stream of a solid adsorbent having preferential adsorbability for nitrogen dioxide in a manner producing dense-phase fluidization thereof, to recover the nitrogen dioxide therefrom, and wherein (9) a portion of said residual gas mixture is contacted with a third sector of said last mentioned stream of a solid adsorbent to purge it from any residual nitrogen dioxide.

12. The method according to claim 10 wherein a portion of said cool residual gas mixture is contacted with a third sector of said circulating stream of granular adsorbent having a preferential adsorbability for water to cool said granular adsorbent after it has been contacted with said gas mixture in hot condition (1) and before it is contacted with said gas mixture in cooled condition (3).

13. The method of drying a hot gas mixture which comprises (1) conducting said gas mixture through a first sector of a circulating stream of a solid granular adsorbent such as silica gel to heat said adsorbent and evaporate any moisture held in its pores, thereafter (2a) conducting said gas mixture including said evaporated moisture through a first sector of a circulating stream of a cooling liquid to cool said gas mixture and condense part of the water vapor contained therein; (2b) conducting a cool dry gas through a second sector of said circulating stream of cooling liquid to restore its effectiveness as a coolant, and (3) conducting said gas mixture in cooled condition through a second sector of said circulating stream of solid granular adsorbent to cause adsorption of any remaining water vapor onto said adsorbent.

14. A combined adsorption and desorption apparatus adapted to separate a selected component from a cool mixture of gaseous fluids, comprising an enclosure of predominantly vertical compass, valving means adapted to pass granular solids in downward direction while inhibiting the interchange of gaseous fluids and arranged to divide said enclosure into a first and second chamber, a plurality of vertically spaced perforated plates provided in at least said first chamber, means for cycling granules of an adsorbent material having a preferential adsorbability for said selected component through said enclosure from the top to the bottom end thereof, means for conducting the cool mixture of gaseous fluids to be processed through said first chamber from the bottom to the top thereof against the descending granules of adsorbent material in a manner adapted to form fluidized beds upon the perforated plates in said first chamber to promote adsorption of said selected component from said mixture onto said granules, and means for passing a gaseous heating medium through said second chamber against the descending granules to effect desorption of said selected component from said granules, said first chamber being materially extended in height beyond the height necessary to adsorb substantially all of said selected component from said mixture of gaseous fluids and containing vertically spaced perforated plates in said extended portion so as to provide a zone for cooling the hot granules of adsorbent material discharged from said second chamber in fluidized condition before they contact said mixture of gaseous fluids in a condition in which it still contains said selected component.

15. The method according to claim 13 wherein said cool dry gas is contacted with said circulating stream of cooling liquid under such conditions as to evaporate substantially the same quantity of liquid as is added to said circulating stream by condensation of part of the water vapor contained in said gas mixture.

16. Apparatus for contacting gaseous fluids and granular solids comprising an enclosure of predominantly vertical compass; means for recycling granular solids through said enclosure; partitioning means dividing said enclosure into a plurality of superposed chambers in a manner permitting flow of said granular solids from higher to lower ones of said chambers while inhibiting exchange of gaseous fluids between said chambers, said partitioning means comprising a downwardly directed conduit, a lid means spaced from the lower end of said conduit by a distance at least as large as the maximum dimension of said granules, said lid means being sufficiently large in area to fully arrest the flow of granular solids from the end of said conduit at said above defined distance from said conduit, and means causing said lid means to oscillate between said above defined position and positions permitting free flow of said granular solids from the end of said conduit; ducts for delivering different gaseous fluids individually into said chambers at the lower ends thereof; ducts for exhausting said gaseous fluids individually from said chambers at the upper ends thereof; a plurality of vertically superposed perforated plates provided in each of said chambers; down spouts arranged in each of said plates and lids associated with each of said down spouts to inhibit upward flow of said gaseous fluids through said spouts but adapted to yield away from said spouts upon accumulation of a predetermined quantity of said granular solids thereon.

17. Apparatus for contacting granular solids sequentially with a plurality of different gaseous fluids comprising an enclosure; means for delivering granular solids into said enclosure at the upper end thereof; means for discharging granular solids at the lower end thereof; partitioning means dividing said enclosure into a plurality of superposed chambers, ducts for delivering different gaseous fluids individually into said chambers at the lower ends thereof, ducts for exhausting said gaseous fluids from said chambers at the upper ends thereof each of said partitioning means comprising a pair of vertically superposed funnels having downwardly directed tubular extensions, lids disposed below the bottom ends of said tubular extensions and means for reciprocating said lids in displaced phase relation between a first position wherein they fully arrest the flow of granular solids from their respective funnel extensions and a second position wherein they permit free flow of granular solids from said funnel extensions; and a plurality of vertically superposed perforated plates provided in at least one of said chambers.

18. Apparatus for contacting granular solids sequentially with a plurality of different gaseous fluids comprising an enclosure; means for delivering granular solids into said enclosure at the upper end thereof; means for discharging granular solids at the lower end thereof; partitioning means dividing said enclosure into a plurality of superposed chambers, each of said partitioning means comprising a pair of vertically superposed funnels having downwardly directed tubular extensions, lids disposed below the bottom ends of said tubular extensions, and means for reciprocating said lids in displaced phase relation between a first position spaced vertically from the bottom end of their respective tubular funnel extensions by a distance at least as large as the maximum dimension of the granular solids employed, said lids being large enough to fully arrest the flow of granular solids from the bottom ends of their respective funnel extensions when in said first position, and a second position wherein said lids permit free flow of granular solids from said funnel extensions; and a plurality of vertically superposed perforated plates provided in at least one of said chambers.

19. Apparatus for sequentially contacting solid granules with a plurality of different gaseous fluids, comprising an enclosure, means for delivering the granules into said enclosure at the upper end thereof, means for discharging the granules from said enclosure at the lower end thereof, partitioning means dividing said enclosure into a plurality of vertically superposed chambers and including valve means adapted to pass granular solids from an upper to a lower one of said chambers while inhibiting exchange of gaseous fluids between said chambers, ducts for delivering different gaseous fluids individually into said chambers at the lower ends thereof, ducts for exhausting said gaseous fluids individually from said chambers at the upper ends thereof, and a plurality of vertically superposed perforated plates provided in at least one of said chambers.

20. Apparatus for sequentially contacting solid granules with a plurality of different gaseous fluids, comprising an enclosure, means for delivering the granules into said enclosure at the upper end thereof, means for discharging the granules from said enclosure at the lower end thereof, partitioning means dividing said enclosure into a plurality of vertically superposed chambers and including valve means operable to pass granular solids from higher to lower ones of said chambers while inhibiting exchange of gaseous fluids between said chambers and level sensing means arranged to control the operation of said valve means according to the level of the granular solids accumulating in said valve means, ducts for delivering different gaseous fluids individually into said chambers at the lower ends thereof, ducts for exhausting the gaseous fluids individually from said chambers at the upper ends thereof, and a plurality of vertically superposed perforated plates provided in at least one of said chambers.

References Cited in the file of this patent

UNITED STATES PATENTS

| Number | Name | Date |
| --- | --- | --- |
| 960,857 | Eggert | June 7, 1910 |
| 1,335,348 | Patrick et al. | Mar. 30, 1920 |
| 1,443,220 | Guye | Jan. 23, 1923 |
| 1,825,707 | Wagner, Jr. | Oct. 6, 1931 |
| 1,836,301 | Bechthold | Dec. 15, 1931 |
| 2,073,112 | Lindinger | Mar. 9, 1937 |
| 2,116,981 | Peo | May 10, 1938 |
| 2,270,903 | Rudbach | Jan. 27, 1942 |
| 2,304,128 | Thomas | Dec. 8, 1942 |
| 2,314,316 | Schlesman | Mar. 16, 1943 |
| 2,325,203 | Hayes | July 27, 1943 |
| 2,345,774 | Simpson | Apr. 4, 1944 |
| 2,367,281 | Johnson | Jan. 16, 1945 |
| 2,367,694 | Snuggs | Jan. 23, 1945 |
| 2,381,505 | Lindholm | Aug. 7, 1945 |
| 2,384,311 | Kearby | Sept. 4, 1945 |
| 2,432,298 | Eastwood et al. | Dec. 9, 1947 |
| 2,476,472 | Arnold et al. | July 19, 1949 |
| 2,495,842 | Gilliland | Jan. 31, 1950 |
| 2,523,149 | Scheeline | Sept. 19, 1950 |
| 2,529,289 | Gilliland | Nov. 7, 1950 |
| 2,548,502 | Small | Apr. 10, 1951 |
| 2,550,955 | Berg | May 1, 1951 |
| 2,559,116 | Doschek | July 3, 1951 |
| 2,568,396 | James | Sept. 18, 1951 |
| 2,578,674 | Daniels et al. | Dec. 18, 1951 |
| 2,590,322 | Imhoff et al. | Mar. 25, 1952 |

FOREIGN PATENTS

| Number | Country | Date |
| --- | --- | --- |
| 455,734 | Great Britain | Oct. 27, 1936 |

OTHER REFERENCES

"Hypersorption Process," Clyde Berg; A. I. Ch. E. Transaction, vol. 42, #4, August 25, 1946, pages 665–680.